United States Patent [19]
Paul et al.

[11] Patent Number: 5,081,961
[45] Date of Patent: Jan. 21, 1992

[54] INTERNAL COMBUSTION ENGINE WITH ROTARY EXHAUST CONTROL

[76] Inventors: ˙︎rius A. Paul; Ana Paul, both of 969 La Paz, Placentia, Calif. 94670

[21] Appl. No.: 387,897

[22] Filed: Aug. 1, 1989

[51] Int. Cl.⁵ .............................................. F02B 25/08
[52] U.S. Cl. ................................ 123/51 B; 123/65 V; 123/190 BF
[58] Field of Search ................. 123/51 A, 51 B, 65 R, 123/80 R, 190 B, 190 BF, 311, 65 PD, 65 A, 65 V, 76, 315, 79 A

[56] References Cited

U.S. PATENT DOCUMENTS

| | | | |
|---|---|---|---|
| 1,798,855 | 3/1929 | Scott | 123/79 A |
| 1,808,380 | 6/1931 | Royal | 123/51 B |
| 4,484,550 | 11/1984 | Gadefelt et al. | 123/315 |
| 4,572,116 | 2/1986 | Hedelin | 123/78 D |
| 4,791,787 | 12/1988 | Paul et al. | 60/605.1 |
| 4,809,646 | 3/1989 | Paul et al. | 123/51 B |
| 4,827,882 | 5/1989 | Paul et al. | 123/292 |
| 4,841,928 | 6/1989 | Paul et al. | 123/193 CP |
| 4,843,821 | 7/1989 | Paul et al. | 60/605.1 |
| 4,858,566 | 8/1989 | Paul et al. | 123/41.35 |

FOREIGN PATENT DOCUMENTS

| | | | |
|---|---|---|---|
| 131884 | 3/1920 | United Kingdom | 123/190 B |
| 582204 | 11/1946 | United Kingdom | 123/79 A |

OTHER PUBLICATIONS

PCT Application PCT/US84/00754 17 May 1984 (pp. 10–20, FIGS. 1–6).

*Primary Examiner*—Noah P. Kamen
*Attorney, Agent, or Firm*—Bielen, Peterson & Lampe

[57] ABSTRACT

A rotary commutator valve that is located at the exhaust ports of the cylinder of an internal combustion, reciprocal engine for regulating the flow of exhaust and allowing the exhaust ports to be sequentially utilized as supplementary intake ports for charging the engine cylinder, the commutator valve having an exhaust passage, an intake passage and a common exhasut/intake passage that communicates with the exhaust ports and a rotor with a rotor notch that sequentially and selectively connects either the intake passage or the exhaust passage to the common exhasut/intake passage allowing the exhaust ports to first exhaust combustion gases and then form supplemental intake ports for admitting additional air.

16 Claims, 7 Drawing Sheets

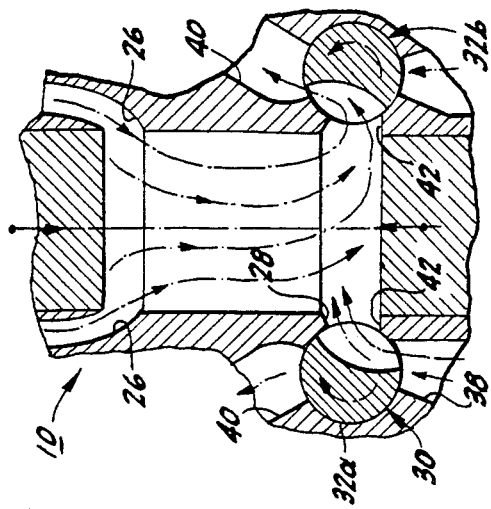
FIG.-2.3
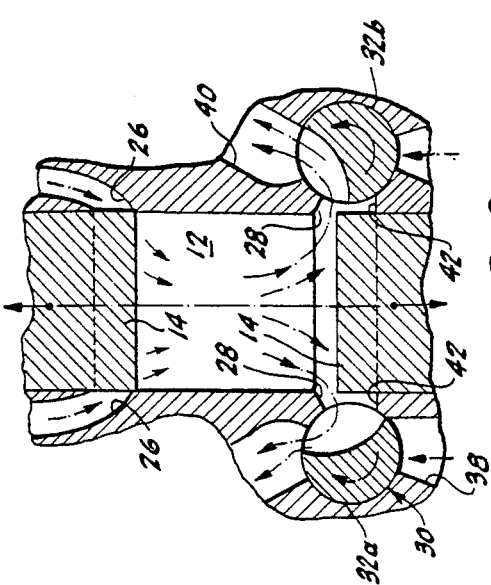
FIG.-2.2
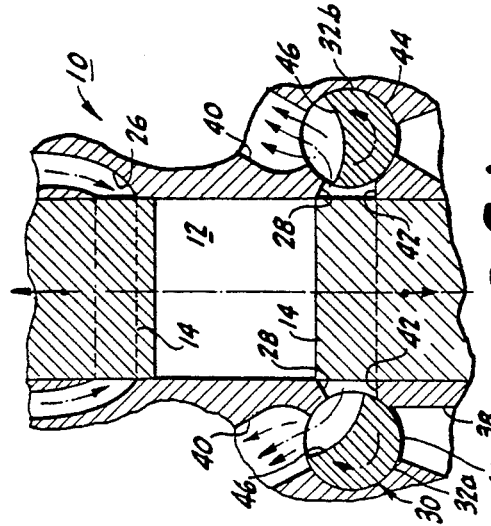
FIG.-2.1
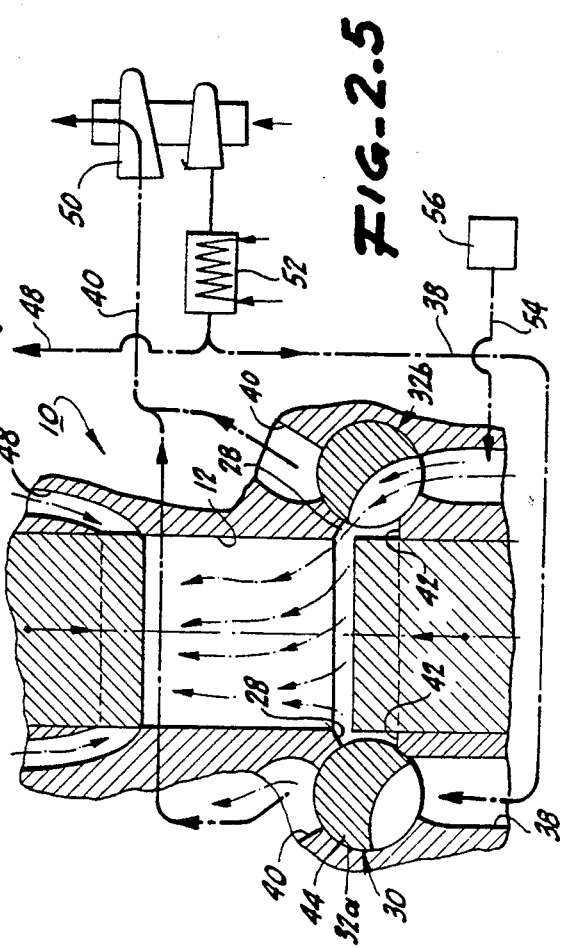
FIG.-2.5
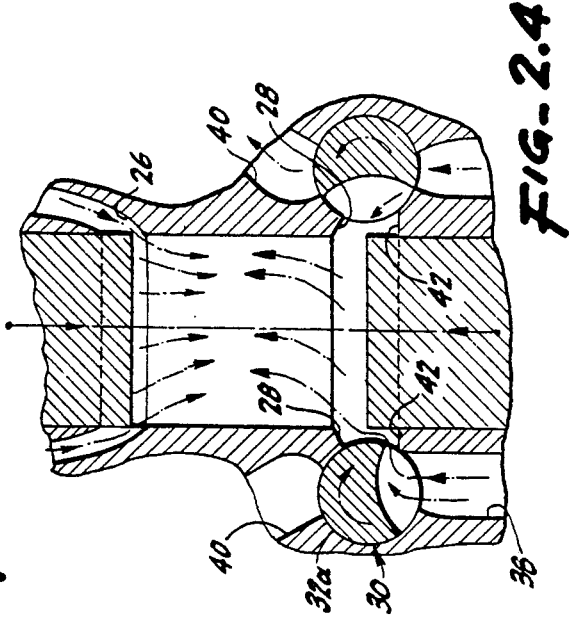
FIG.-2.4

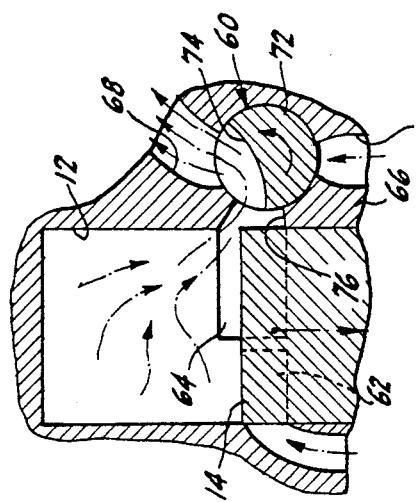
FIG-3.1
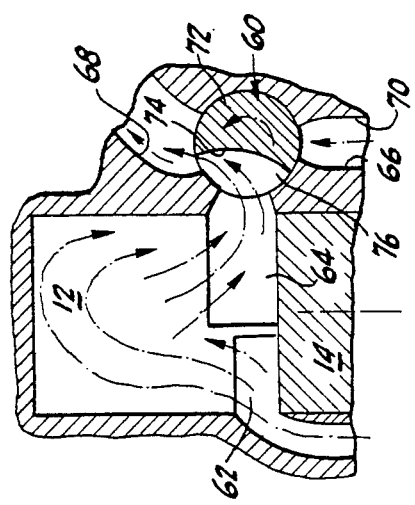
FIG-3.2
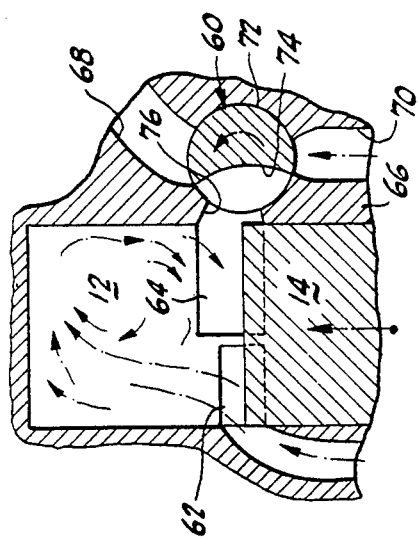
FIG-3.3
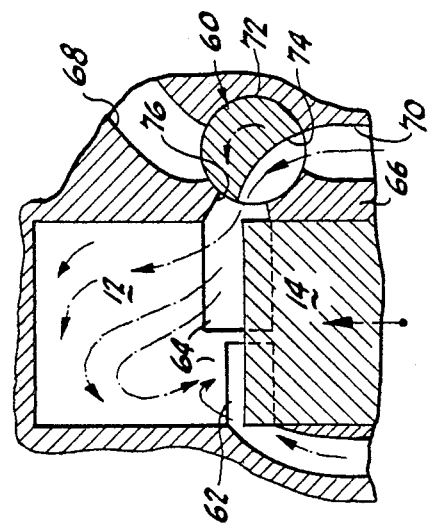
FIG-3.4

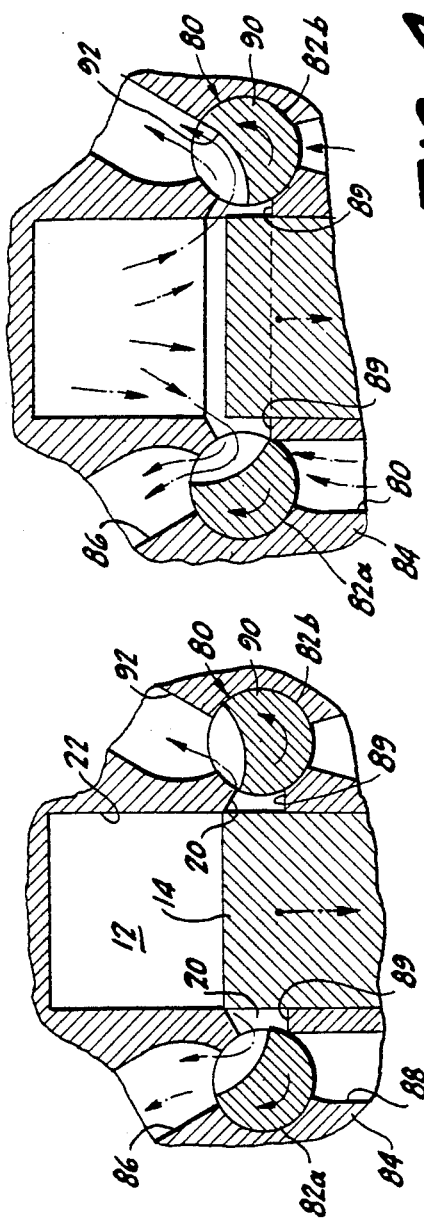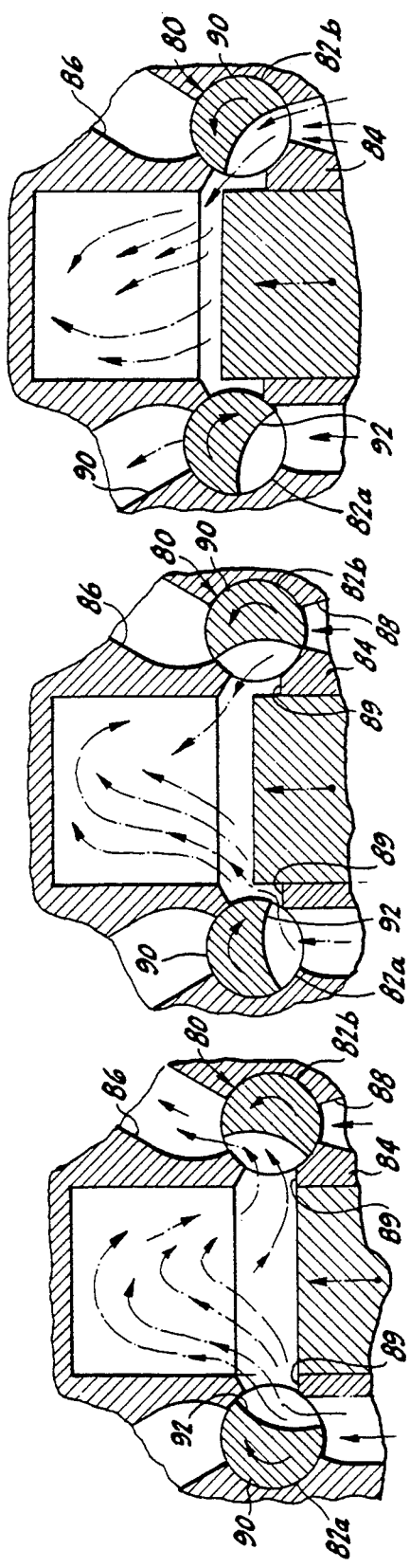

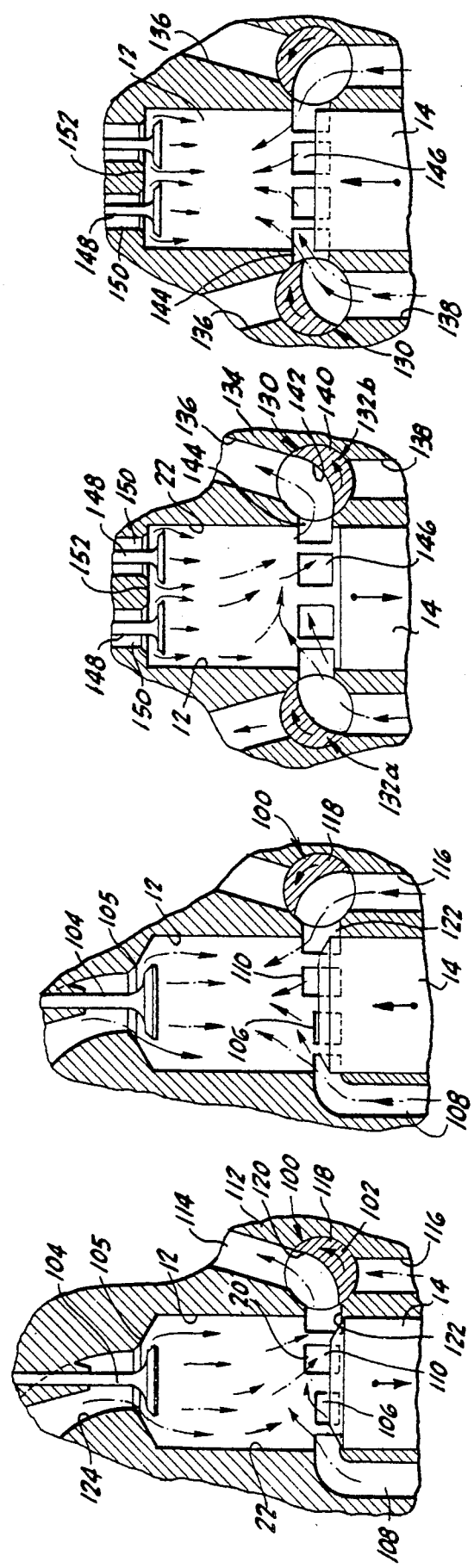

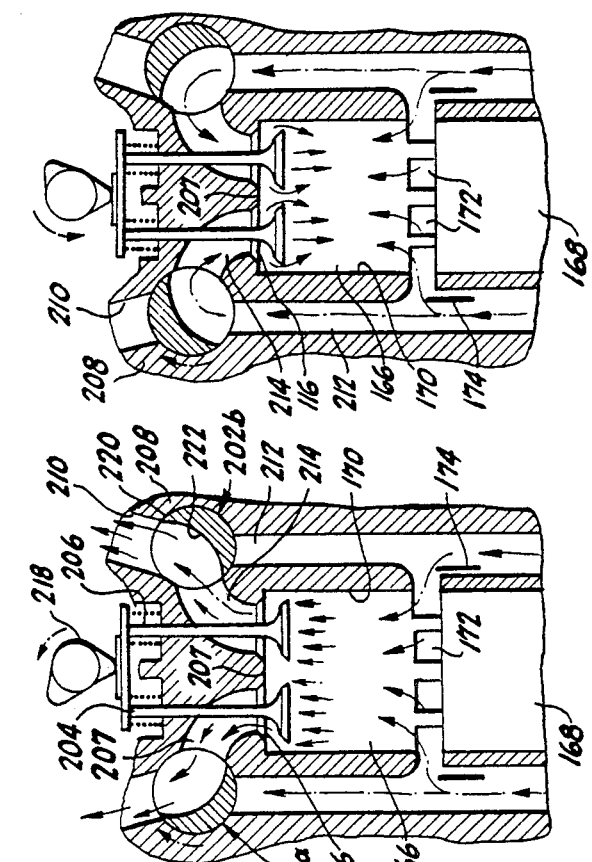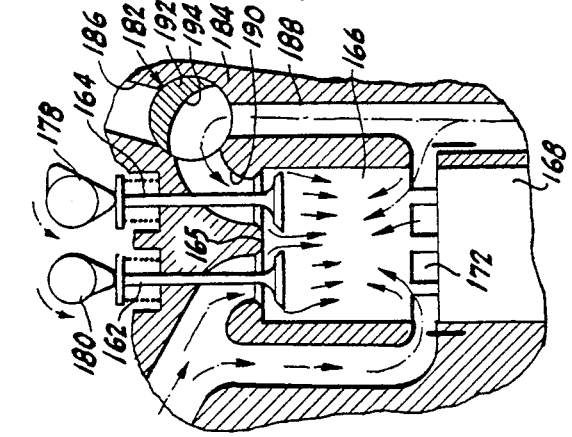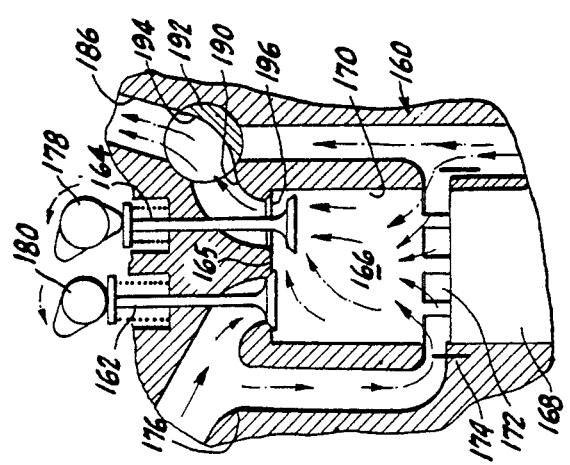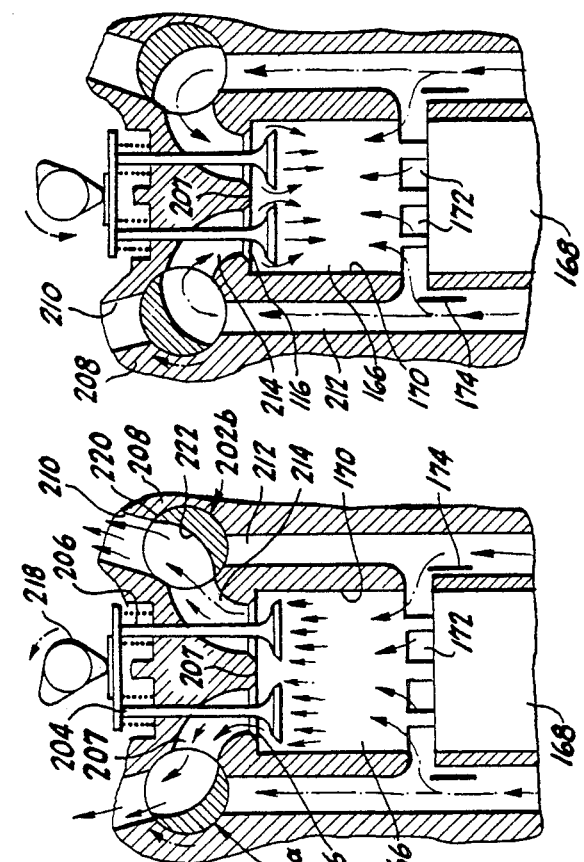

INTERNAL COMBUSTION ENGINE WITH ROTARY EXHAUST CONTROL

BACKGROUND OF THE INVENTION

This invention relates to a rotary commutator valve that is located at the exhaust ports of the cylinder of an engine for regulating the flow of exhaust and allowing the exhaust ports to be sequentially utilized as supplementary intake ports for charging the engine cylinder. The rotary commutator valve of this invention can be incorporated into the high-pressure, high-efficiency engines disclosed in our U.S. Pat. Nos. 4,809,646, issued Mar. 7, 1989, entitled HIGH PRESSURE RECIPROCATOR, 4,791,787, issued Dec. 20, 1988, entitled REGENERATIVE THERMAL ENGINE 4,841,928, issued June 27, 1989, entitled RECIPROCAL ENGINE WITH FLOATING LINER and in our U.S. application for Letters Pat. Ser. No. 341,533, filed Apr. 21, 1989, entitled OPTIMIZED HIGH PRESSURE COMBUSTION ENGINES. In a high-pressure, high r.p.m. engine, the period of time within which to exhaust the combustion gases and charge the cylinder with air, particularly in a two-cycle engine, is extremely brief. Where high peak compression is to be obtained, the effective entry area of the ports for incoming air should equal or exceed the cross sectional area of the cylinder. In this manner the air does not have to expand and after passing through the ports, a maximum charge of air can be obtained by the inertial effect of incoming air when the port opening and closure is properly timed.

Furthermore, in a high-pressure, short-stroke engine, where ports are located in the circumferential wall of the cylinder for intake or exhaust of air when the ports are exposed as the piston reaches the bottom dead center of its cycle, minimizing the height of the ports is of extreme importance to maximize the effective stroke of the piston and hence the compression ratio. Since the compression does not effectively begin until the ports are sealed by the passing piston, the lower the profile of the ports, the greater will be the ultimate compression.

In conventional two-cycle engines where both intake and exhaust ports are located in the wall of the cylinder, the exhaust ports customarily have a higher profile than the intake ports to allow the exhaust gases at high pressure to begin to exhaust through the exhaust ports before the intake ports are exposed and incoming air is admitted to scavenge and charge the cylinder. Because the exhaust ports remain open while the intake ports are exposed, the cylinder is frequently over scavenged wasting precompressed air. Although the rotary commutator valve of this invention is primarily designed for use in two-cycle engines, it can also be applied to four cycle systems, and systems that incorporate a combination of cylinder wall ports and poppet valves.

In general, throughout this application the use of the term ports will be used to indicate the inlet and exhaust openings to the cylinder even though in some cases the openings may actually be regulated by such poppet valves. In an attempt to control the over scavenging of the cylinder, and prevent loss of excessive air, the cylinder is usually incompletely scavenged and a portion of the exhaust gases will remain in the cylinder for subsequent compression with the new charge of air. The scavenging efficiency is usually determined according to the proportion of residual gases to the fresh charge and is usually between 60 and 75% in existing engines. Where the intake air is carbureted, overscavenging can result in the loss of unburned fuel. In addition to the deleterious effect on fuel efficiency, unburned hydrocarbons contribute to environmental pollution and are unacceptable in a modern engine system. The failure to adequately control the entry of air and exhaust of combustion gases has limited the application of two-cycle engines for general automotive use. These problems have been resolved by the rotary commutator valve described herein.

Furthermore, the rotary valve system can be applied to four-cycle engines to improve performance and provide for efficient charging of the engine by permitting the exhaust port to supplement as an intake port after the exhaust phase has been completed. The rotary commutator valve has particular application in a two-cycle, opposed-piston engine that is designed for high pressure operation as described herein.

SUMMARY OF THE INVENTION

The rotary valve system of this invention is adaptable to a variety of two-cycle and four-cycle engines. In its basic form, the rotary commutator valve enables the exhaust ports to sequentially function as intake ports to greatly enhance the charging of the cylinder with air and/or an air fuel mixture. The preferred application of this system is to high pressure, high r.p.m. engines in which the available time to charge the engine cylinder with air is extremely brief. Supplementing the air charged through intake ports with a charge of air through the exhaust ports after scavenging has been completed both increases the effective port area for intake air, and, in most embodiments, prevents excess intake air from passing through the exhaust ports after scavenging has been completed.

In certain embodiments where both the intake ports and exhaust ports are arranged circumferentially in the wall of the cylinder proximate the head of the piston when at bottom dead center, the use of the rotary valve system enables a lower profile in the ports to be maintained to obtain the same effective intake area for charging the cylinder with air. This lower profile is particularly important in short-stroke engines where maximization of the compression ratio is desired. Since compression does not commence until the cylinder wall ports have been covered by the reciprocating piston, a lower profile therefore enables earlier commencement of the compression sequence boosting the compression ratio. These and other improvements will become apparent from a consideration of the detailed description of the preferred embodiments.

BRIEF DESCRIPTION OF THE DRAWINGS

FIGS. 2.1–2.5 are schematic illustrations of the operation of the commutator valve system of FIG. 1.

FIGS. 3.1–3.4 are schematic illustrations of a first alternate embodiment of the rotary commutator valve system of this invention.

FIGS. 4.1–4.5 are schematic illustrations of a second alternate embodiment of the rotary commutator valve system of this invention.

FIGS. 5.1–5.2 are schematic illustrations of a third alternate embodiment of the rotary commutator valve system of this invention.

FIG. 6.1-6.2 are schematic illustrations of a fourth alternate embodiment of the rotary commutator valve system of this invention.

FIG. 7.1-7.2 are schematic illustrations of a fifth alternate embodiment of the rotary commutator valve system of this invention.

FIGS. 8.1-8.2 are schematic illustrations of a sixth alternate embodiment of the rotary commutator valve system of this invention.

DESCRIPTION OF THE PREFERRED EMBODIMENTS

Figure 1:
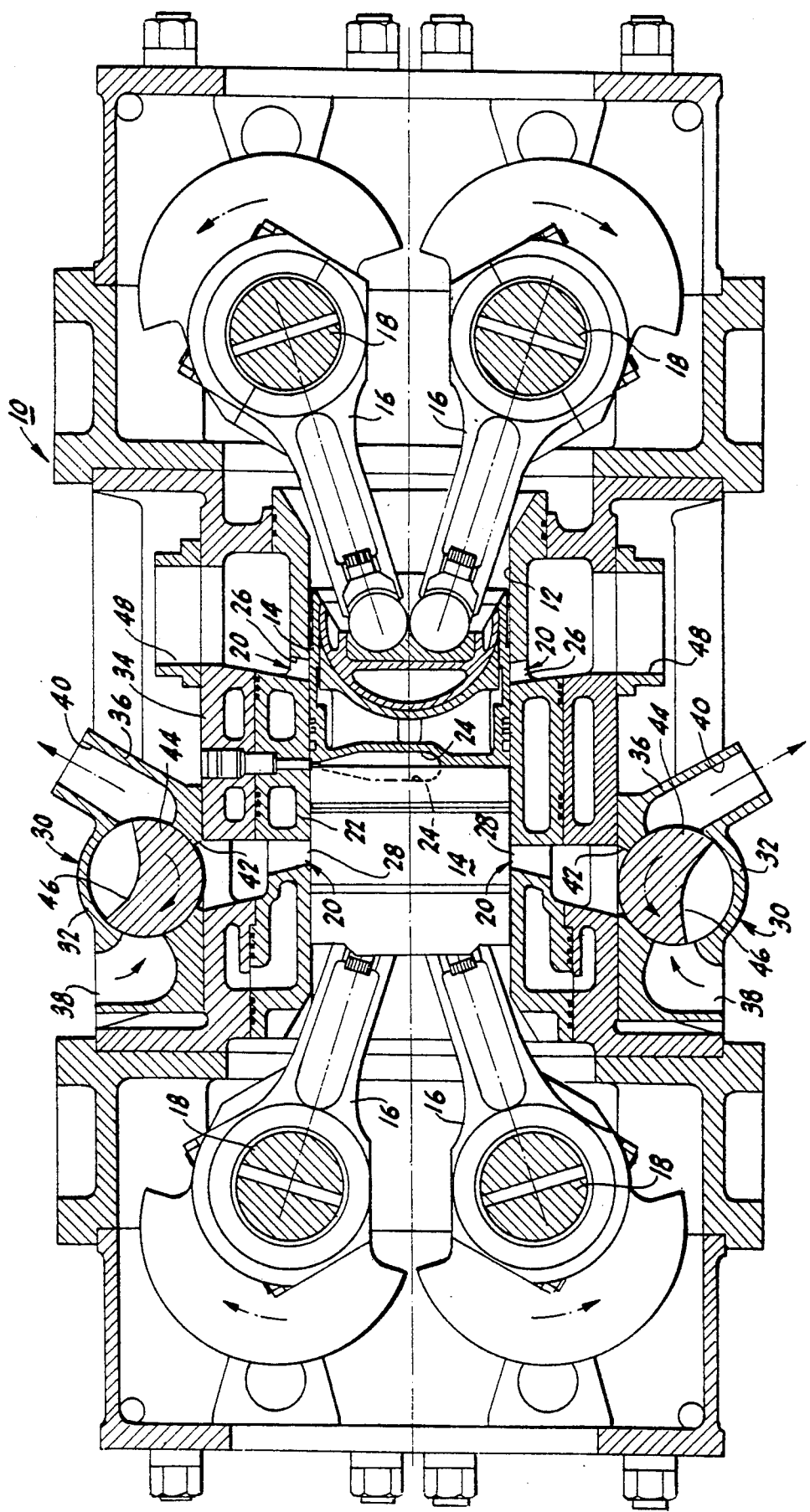
FIG. 1 is a cross sectional view of an opposed piston engine with the rotary commutator valve system of this invention.

Referring now to the drawings, FIG. 1 is a cross sectional view of an engine, designated generally by the reference numeral 10, that incorporates the rotary commutator valve system of this invention. The engine 10 in this preferred embodiment is an opposed-piston engine with a single central cylinder 12 with oppositely directed pistons 14, with each piston connected to dual connecting rods 16, the ends of which are connected to four oppositely rotating crank shafts 18. The engine 10 of FIG. 1 is designed to be a high pressure, low stroke engine with auxiliary super charging components (not shown) for delivering compressed air to the engine cylinder 12.

The opposed-piston construction is designed with ports 20 in the cylinder wall 22 which are located proximate the top or the head 24 of the pistons 14 when the pistons are withdrawn to their bottom dead center positions. At one end of the cylinder 12 are dedicated intake ports 26 and at the opposite end of the cylinder are combination ports 28, which sequentially function to exhaust the gases and allow intake of air through the ports. Located proximate the combination exhaust/intake ports 28 is a rotary commutator valve system 30 with dual commutator valves 32. The use of a pair of commutator valves 32 minimizes constriction of air flow through the valve system enabling maximization of both exhaust of combustion gases and entry of air through the valve system. The rotary valve system 30 is mounted to the housing 34 of the engine 10 as close to the combination ports 28 as possible to minimize the volume of the passage way from the valve system to the cylinder.

The rotary valve system includes a rotor housing 36 with an air intake passage 38, an exhaust gas outflow passage 40, a common communicating passage 42 that connects to the combination ports 28, and, a specially configured cylindrical rotor 44 with a bypass notch 46. The bypass notch forms a conduit that selectively connects either the intake passage or the outflow passage to the common passage 42. The rotor 44 is rotated by its connection to one of the drive shafts by a timing gear or timing chain (not shown) such that its rotation is timed to the cycle of engine operation. A dedicated intake conduit 48 is mounted to the engine housing 34 for supplying compressed air to the opposite end of the cylinder through the dedicated intake ports 26 when the intake ports 26 are exposed.

Referring now to FIGS. 2.1-2.5 a series of schematic illustrations are shown to depict the sequential manner in which the rotary valve system 30 operates on the opposed-piston engine of FIG. 1. In FIG. 2.1 the pistons 14 are illustrated being retracted and are at the point at which the combination exhaust/intake ports 28 are becoming exposed such that the exhaust gases will be vented through the common passage 42 as shown by the diagrammatic arrows. The cylindrical rotors 44 are arranged with their bypass notches 46 slightly out of phase from one another in order to allow the dominant flow of the exhaust gases to pass through one commutator valve 32a before the other valve 32b is fully open. As shown in FIG. 2.2, the pistons 14 have further withdrawn and are at the point of exposing the dedicated intake ports 26 allowing fresh air to enter the one end of the cylinder 12 scavenging the exhaust gases out both of the combination ports 28 for a brief moment. As shown in FIG. 2.3, when the pistons reach their bottom dead center the intake ports 26 are fully exposed and the commutator valve 32a has rotated sufficiently to admit intake air into the combination port 28 to scavenge the last remaining exhaust gases through the commutator valve 32b before this valve closes. As shown in FIG. 2.4, as the opposed pistons commence their compression stroke, the air charge continues to enter through the intake ports 26 and the combination ports 28 serviced by the commutator valve 32a. The commutator valve 32b has its rotor 44 blocking the exhaust passage 40 preventing losses of compressed air. Finally, as shown in the schematic illustration of FIG. 2.5 the rotor 44 of the commutator valve 32a has blocked both the air intake passage 38 and the exhaust outflow passage 40. The commutator valve 32b continues to allow the last portion of the air charge to pass through the combination ports 28 before the mutually approaching pistons seal off the combination ports 28 as they have sealed the dedicated intake ports 26. As shown added to the schematic illustration of FIG. 2.5, the engine 10 is equipped with a turbocharger 50 for receiving exhaust gases from the outflow passages 40 and delivering compressed air through an intercooler 52 to provide dense compressed air to the engine cylinder 12 through the intake passage 38 and the intake conduit 48. Additionally, a fuel line 54 supplies fuel from a source 56 to the air passage 38 of the commutator valve 32b after all exhaust avenues are blocked.

The rotary valve system 30 can be adapted to a variety of conventional styled engines having different modes of operation. For example, referring now to FIGS. 3.1-3.4 a series of schematic illustrations shows the use of the rotary commutator valve system, designated here by the reference numeral 60, on a two-cycle engine having a piston 14 reciprocal in a cylinder 12 with an intake port 62 and an exhaust port 64 that is revised to function as a a combination exhaust/intake port. As is customary the exhaust port 64 has a slightly higher profile than the intake port 62 to allow exhaust gases from combustion in the cylinder to evacuate when the exhaust port becomes exposed by the descending piston 14 as shown in FIG. 3.1. The valve system 60 has a housing 66 with an exhaust passage 68 and an intake passage 70. A cylindrical rotor 72 with a by-pass notch 74 operates as a commutator valve to connect either the exhaust passage 68 or the intake passage 70 with the common passage of the 76 combination intake/exhaust port 64. As shown in FIG. 3.1, the rotor 72 is positioned such that the exhaust can pass through the exhaust passage under pressure of the high temperature combustion. As shown in FIG. 3.2, the intake ports are completely exposed by the piston when at bottom dead center allowing air to both charge the cylinder and scavenge the remaining gases out the exhaust ports and past the commutator valve. After reaching the bottom dead center the piston begins to rise in the compression stroke and the communication with the exhaust passage is closed by the rotor 72 with the rotor notch 74 about to permit entrance of supplementary air from the intake passage 70.

As shown in FIG. 3.4, as the piston proceeds in the compression stroke and seals off the dedicated intake port 62, the combination exhaust/intake port remains open to receive additional air through the supplementary intake at the intake passage 70. When the piston passes the higher profile combination exhaust/intake port the cylinder is sealed and the compression proceeds to the point the piston reaches the top dead center for combustion and repetition of the cycle.

This arrangement can be modified as shown in FIGS. 4.1–4.5. As shown in FIG. 4.1, the engine has a cylinder 12 with a piston 14 reciprocal in the cylinder and ports 20 in the cylinder wall 22 proximate the bottom dead center position of the piston. The valve system 80 of this arrangement includes a pair of commutator valves 82a and 82b each valve having a housing 84 with an exhaust passage 86, an intake passage 88 and a common passage 89. The commutator valves 82a and 82b each have a rotor 90 with a rotor notch 92 with the two rotor notches 92 being slightly out of phase on each of the rotors 90 such that a desired phased system of exhaust and scavenging is achieved with the commutator valves through ports 20 that have the same profile. As shown in FIG. 4.1, when the piston exposes the ports, exhaust is able to flow through commutator valve 82a in which the rotor has fully opened the exhaust passage 86. As the piston completes its descent the commutator valve 82 provides auxiliary exhaust of combustion gases. However, as the piston reaches its bottom dead center and begins to rise, the advanced commutator valve 82a has allowed communication of the ports with the intake passage 88 to allow intake air to enter the cylinder and scavenge any remaining exhaust gases through the still open commutator valve 82 which communicates with the exhaust passage 86. As the piston begins rising, the advance commutator valve 82a begins to close while the retarded commutator valve 82b opens to allow a final charge of air to enter the cylinder as shown in FIG. 4.5 before the piston 14 finally seals the ports from communication with the cylinder.

In FIGS. 5.1–5.2 a valve system 100 combines a rotary commutator valve 102 with a single poppet valve 104, that is centrally mounted in a cylinder head 105 at the cylinder 12. The cylinder wall 22 has a system of ports 20 that are similar in our arrangement to that of the engine depicted in FIGS. 3.1–3.4. Dedicated intake ports 106 communicate with an air intake 108 and combination exhaust/intake ports 110 communicate with the commutator valve 102. The commutator valve 102 has a housing 112 with an exhaust passage 114 and intake passage 116 and the cylindrical rotor 118 with a rotor notch 120 that provides a bypass from either the intake or exhaust passages through the rotor to a common passage 122 leading to the combination ports 110.

In operation, as shown in FIG. 5.1, when the piston is at the end of its power stroke, the poppet valve 104 is open and together with the exposed dedicated intake ports 106 charges the cylinder with air and sweeps any remaining combustion gases out through the combination ports 110 while the rotor notch 120 is oriented to connect the common passage 122 with the exhaust passage 114 through the rotor notch 120. As shown in FIG. 5.2, as the piston begins to rise from the bottom dead center the rotor 118 rotates sufficiently to seal the exhaust passage from the cylinder and allow air intake to flow through the combination ports from the intake passage to fully charge cylinder with air before the cylinder wall ports are sealed and the poppet valve seals the auxiliary air intake passage 124.

As shown in FIG. 6.1 and 6.2 a dual valve system 130 is shown that is similar in construction and operation as the system of FIGS. 1.1–1.5. The valve system 130 includes commutator valves 132a and 132b having a housing 134 with an exhaust passage 136 and an intake passage 138. A cylindrical rotor 140 has a rotor notch 142 which selectively connect the exhaust passage or intake passage to a common passage 144 which communicates directly with a series of ports 146 around the cylinder wall 22 proximate the bottom dead center position of the piston 14. The rotors are rotated out of phase such that a sequence is developed to effectively purge and charge the cylinder during each cycle of operation. A cylinder 12 has at its opposite end a cylinder head 152 with a plurality of poppet valves 148 that regulate the connection of an intake passages 150. As shown in FIG. 6.1, with the piston at its bottom dead center, the commutator 132a is fully open to allow air to enter the cylinder together with the air from the poppet valve passages to purge any remaining exhaust gases through the exhaust passage that is connected through the commutator valve 132b to the combination ports 146. Again, as the piston begins to rise in its compression stroke, the exhaust passage 136 is blocked by the rotor 140 of the commutator valve 132b allowing all of the connected air passages to provide a charge of intake air into the cylinder. In this manner, during each cycle of operation the exhaust gases are totally exhausted and scavenged from the cylinder and the exhaust passage is blocked while the full pressure of the intake charge, including any inertial effect is allowed to fill the cylinder from all available ports.

The rotary commutator valve system of this invention is adaptable to four-cycle engines. For example, referring to FIGS. 7.1 and 7.2 the schematic of a four-cycle engine 160 is shown with a pair of poppet valves 162 and 164 in a cylinder head 165 at the top of a cylinder 166 in which a piston 168 reciprocates. In the cylinder wall 170 are a series of ports 172 which are controlled by a slide valve 174 to allow for scavenging of exhaust gases by scavenging air from an air passage system 176. The slide valve 174 adjusts the intake port area in relation to the level of supercharging and is closed when the exhaust pressure exceeds the intake pressure at partial load or at the start of the engine operation. As shown in FIG. 7.1 the combination exhaust intake poppet valve 164 is controlled by a double lobed cam 178 such that in the scavenging phase of the cycle of operation the valve is open allowing the exhaust gases to be purged by air that is admitted through the cylinder wall ports 172. As shown in FIG. 7.2 the poppet valve 162 that is controlled by a single lobe cam 180 is actuated together with the companion combination poppet valve 164 for air charging. The commutator valve 182 is positioned proximate the combination poppet valve 164 and includes a housing 184 with an exhaust passage 186 and an intake passage 188 with a common passage 190 leading to the engine cylinder 166.

A cylindrical rotor 192 selectively connects either the intake passage or the exhaust passage to the common passage by a bypass notch 194. In FIG. 7.1 the commutator rotor 192 is positioned to allow the exhaust gases being scavenged to pass through the common passage 190 and out the exhaust passage 186. In FIG. 7.2 the commutator rotor blocks the exhaust passage and allows communication of the intake passage with the common passage to provide for full charging of the engine through the cylinder wall ports 172 and the ports 196 regulated by the poppet valves 162 and 164.

As a further embodiment of the invention, the rotary valve system 200 is shown in FIGS. 8.1–8.2 adapted for use with a four-cycle engine utilizing dual commutator valves 202a and 202b cooperatively arranged with a pair of poppet valves 204 and 206 in a cylinder head 207 at one end of a cylinder 166 having a piston reciprocal therein. The cylinder 166 includes a cylinder wall 170 with a plurality of ports 172 that are exposed when the piston 168 approaches the bottom dead center. The ports 172 are associated with a slide valve 174 that regulates the air admission into the cylinder during scavenging. The commutator valves 202 include a housing 208 with an exhaust passage 210 and intake passage 212 and a common passage 214 that communicates with the ports 216 that are regulated by the poppet valves 204 and 206. A two lobed cam 218 moves the poppet valves in unison in and out of the cylinder at appropriate times during the engine cycle. In FIG. 8.1 the rotor 220 of the commutator valves are positioned such that the rotor bypass notch 222 permits the common passage to communicate with the exhaust passage. With the poppet valves are in the open position air is admitted through the ports 172 in the cylinder wall 170 of the cylinder 166 to scavenge the remaining exhaust gases out through the poppet valve ports 216. After scavenging has been completed and during the intake stroke all valve ports are open and the cylindrical rotor is oriented such that the bypass notch allows communication of the intake passages 212 with the common passage 214 such that air charges the cylinder from both the top end, through the poppet valve ports 216, and the bottom end, through the cylinder wall ports 172.

In all of the various embodiments it is preferred that cylinder wall ports be provided with or without additional valve protection means to maximize the effective port area through which the intake air must pass into the cylinder. The preferred design is that the effective intake port area exceed the cross sectional area of the cylinder to allow for unimpeded passage of air into the cylinder. Preferably the port sizing and the valve timing is adjusted to allow an excess charge of air to enter the ports through inertial effects of the dynamic air column. By appropriate tuning of the scavenging and intake cycle, abrupt sealing of the exit passages and commutation to additional intake passages will provide a pressurized charge in the cylinder that exceeds the pressure under which the air is delivered to the cylinder. Preferably, the air charging system is under high pressure developed by an associated turbo charger or other compressor means.

Figure 9:
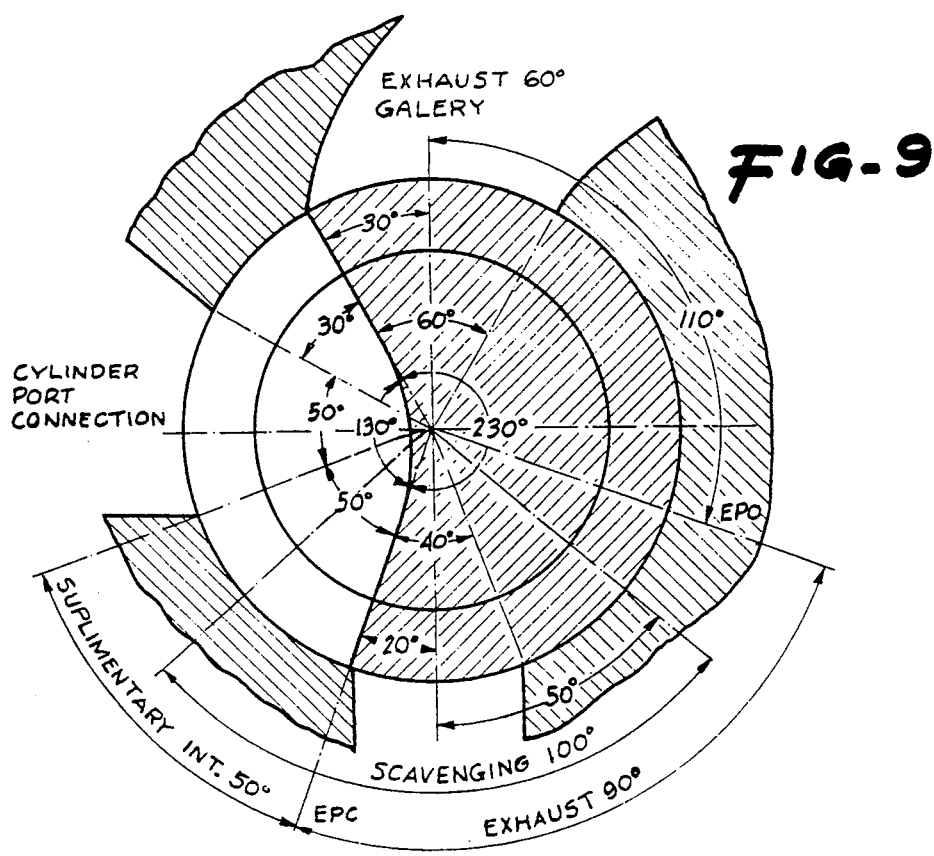
FIG. 9 is a schematic timing diagram showing the passage arrangement and rotor configuration of the rotary commutator valve system of this invention as applied to two-cycle engines.
Figure 10:
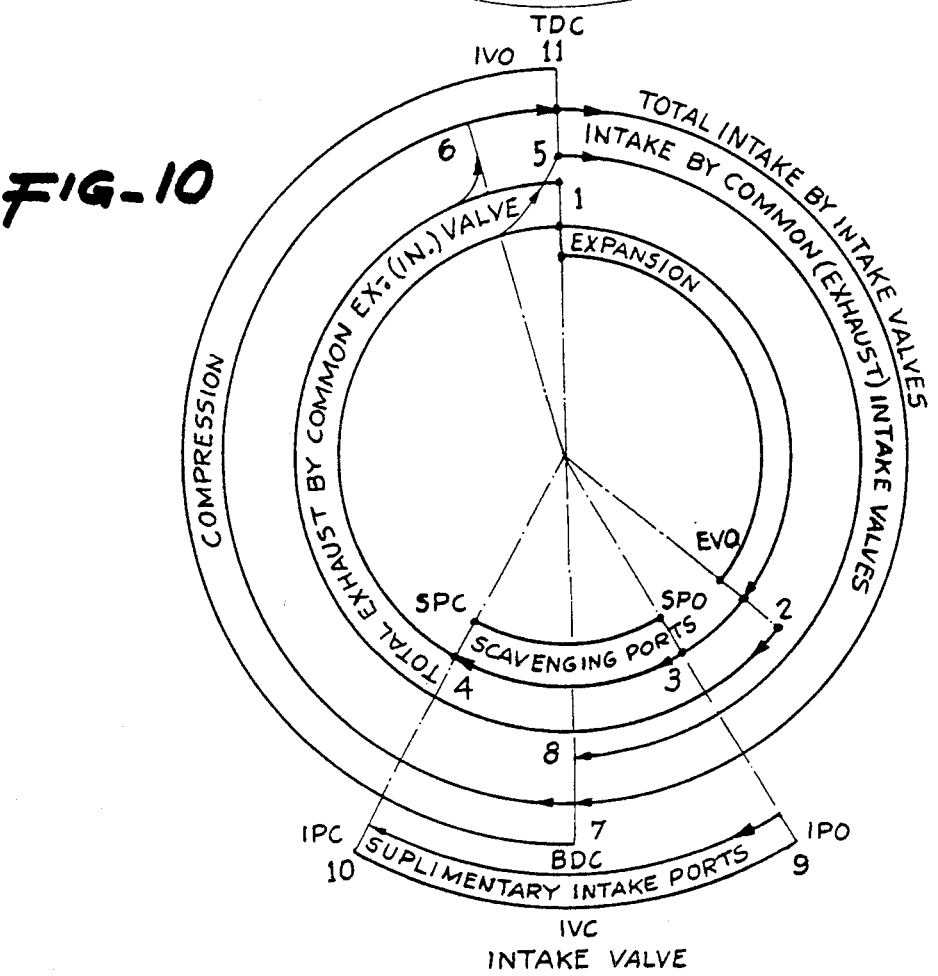
FIG. 10 is a schematic diagram of the timing cycle for the rotary commutator valve system of this invention as applied to four cycle engines.

Diagrammatic illustrations of the two-cycle and four-cycle arrangements are depicted in FIGS. 9 and 10 respectfully. In FIG. 9 the timing diagram for a two-cycle engine, in particular the engine of FIGS. 2.1–2.4, is shown with the angular relationship of the cylindrical rotor and its bypass notch to the exhaust passage, the intake passage and the common passage that connects to the cylinder port.

The diagrammatic illustration of FIG. 10 depicts the timing diagram for a four-cycle engine with a triple intake process exemplified in particular with respect to FIGS. 7.1 and 7.2.

In all of the foregoing embodiments, the rotary commutator valve system enables the passages communicating with the cylinder, that have ordinarily been dedicated to exhausting combustion gases, to be utilized to both exhaust decombustion gases and subsequentially provide a supplemental intake passage for the supply of intake air together with other dedicated intake passages.

What is claimed is:

1. An internal combustion engine with a sequential operating cycle, the engine comprising:
   a cylinder;
   a piston reciprocal in the cylinder;
   at least one intake port for admitting air into the cylinder in combination with at least one exhaust/intake port for exhausting combustion gases from the cylinder and admitting additional air into the cylinder; and,
   a rotary commutator valve system including:
   at least one rotary commutator valve arranged in the engine proximate the exhaust/intake port, the commutator valve having an exhaust passage, an air intake passage, a common exhaust/intake passage that is connected to the exhaust/intake port, and a rotor having a bypass means for selectively and sequentially connecting the exhaust passage and the intake passage to the common exhaust/intake passage on rotation of the rotor, wherein the rotor is timed with the engine operating cycle to exhaust combustion gases through the exhaust/intake passage and the exhaust passage, scavenge remaining gases through the exhaust/intake passage and exhaust passage by air admitted to the cylinder through the intake port, and charge the cylinder with air through both the intake port and the exhaust/intake port by way of the intake passage and exhaust/intake passage wherein the cylinder has a cylinder wall and the intake port and the exhaust-/intake port are located in the wall of the cylinder and are exposed when the piston is at the bottom dead center of reciprocation.

2. The engine of claim 1 wherein the intake port and the exhaust/intake port have a combined port area greater than the cross sectional area of the cylinder.

3. The engine of claim 1 wherein the exhaust/intake port has a higher profile than the intake port and air continues to be admitted through the exhaust/intake port after the intake port is sealed by the piston.

4. The engine of claim 3 comprising further a cylinder head with at least one additional air intake port with an air passage in the head and at least one poppet valve means for admitting air into the cylinder to scavenge combustion gases from the cylinder and charge the cylinder with air in conjunction with air admitted through the intake port and supplemental air admitted through the exhaust/intake port.

5. An internal combustion engine with a sequential operating cycle, the engine comprising a cylinder with a cylinder wall, a piston reciprocal in the cylinder, exhaust/intake ports located in the wall of the cylinder and exposed when the piston approaches bottom dead center for admitting air into the cylinder and exhausting combustion gases from the cylinder, and a rotary commutator valve system comprising: first and second rotary commutator valves arranged in the engine on each side of the cylinder proximate the exhaust/intake ports, the rotary commutator valves each having a housing with an air intake passage, a combustion gas exhaust passage and a common exhaust/intake passage communicating with the exhaust/intake ports, with a rotor interposed between the common exhaust/intake passage and the exhaust and intake passages, the rotor having a bypass means for selectively and sequentially connecting the exhaust passage and the intake passage with the common passage on rotation of the rotor, wherein the rotors of the commutator valves are rotated out of phase with one another such that the bypass means of one valve is advanced relative to the other bypass means, wherein gases are first exhausted through one valve before exhaust of gases commences through the other valve and air is admitted to the former valve while exhaust of gases continues through the latter valve to scavenge the cylinder, and wherein a final charge of air is admitted through the latter valve.

6. The engine of claim 5 comprising further, a cylinder head with at least one additional air intake port with an air passage in the head and at least one poppet valve means for admitting air into the cylinder to scavenge combustion gases from the cylinder and charge the cylinder with air in conjunction with air admitted through the exhaust/intake ports.

7. The engine of claim 5 wherein fuel is added to the air charge after the exhaust passages have closed.

8. The engine of claim 7 wherein the engine has an additional piston in the cylinder wherein the pistons are oppositely arranged, the cylinder having air intake ports located in the wall of the cylinder and exposed when the additional piston approaches bottom dead center, wherein air is admitted through the intake ports to scavenge combustion gases from the cylinder through the exhaust/intake ports and charge the cylinder with air through the air intake ports in conjunction with air subsequently admitted through the exhaust/intake ports on rotation of the rotor.

9. The engine of claim 8 wherein the effective area of the air intake ports and the exhaust/intake ports is greater than the cross sectional area of the cylinder.

10. An internal combustion engine with a sequential operating cycle, the engine comprising a cylinder, a piston reciprocal in the cylinder, a cylinder head with an air intake port and an exhaust/intake port, a poppet valve in the air intake port and a poppet valve in the exhaust/intake port, and, a rotary commutator valve system comprising:

a rotary commutator valve arranged in the engine proximate the exhaust/intake port, the commutator valve having an exhaust passage, an air intake passage, a common exhaust/intake passage communicating with the exhaust/intake port and a rotor having a bypass means for selectively and sequentially connecting the exhaust passage and the intake passage to the common exhaust/intake passage on rotation of the rotor wherein the rotor is timed with the poppet valves to exhaust combustion gases through the exhaust/intake port, scavenge remaining gases through the exhaust/intake port by air admitted through the intake port, and charge the cylinder with air through both the intake port and the exhaust/intake port by way of the intake passage and common exhaust/intake passage.

11. The engine of claim 10 wherein the cylinder has a cylinder wall with additional air intake ports located in the cylinder wall and exposed by the piston when at bottom dead center.

12. The engine of claim 11 wherein the additional air intake ports in the cylinder wall have a slide valve for regulating the opening of the ports.

13. The engine of claim 11 wherein the poppet valves have actuating means for actuating the poppet valves to exhaust combustion gases through the exhaust/intake port and subsequently admit air through both the air intake port and the exhaust/intake port.

14. The engine of claim 13 wherein the engine has a four-cycle operation.

15. An engine with a sequential operating cycle, the engine comprising:

a cylinder with a cylinder wall, a piston reciprocal in the cylinder, intake ports located in the wall of the cylinder and exposed when the piston is at bottom dead center, a cylinder head, spaced exhaust/intake ports in the cylinder head with poppet valves at the exhaust/intake ports, and, a rotary commutator valve system wherein the rotary commutator valve system includes:

rotary commutator valves arranged at each exhaust/intake passage communicating with the exhaust/intake ports, and a rotor interposed between the common exhaust/intake passage and the intake and exhaust passages, the rotor having bypass means for selectively and sequentially connecting the exhaust passage and the intake passage to the common exhaust/intake passage on rotation of the rotor wherein the rotors of the commutator valves are rotated out of phase with one another such that the bypass means of one valve is advanced relative to the other bypass means, wherein gases are first exhausted through one valve before exhaust of gases commences through the other valve and air is admitted to the former valve while exhaust of gases continues through the latter valve to scavenge the cylinder, and wherein a final charge of air is admitted through the latter valve.

16. The rotary commutator system of claim 15 wherein the intake ports have a slide valve for regulating the opening of the ports.

* * * * *